Nov. 15, 1966    G. DE VRIES    3,285,628
TUBE JOINT

Filed June 16, 1964    2 Sheets-Sheet 1

GERRIT DE VRIES
*INVENTOR.*

BY V. C. MULLER
ATTORNEY.

Nov. 15, 1966   G. DE VRIES   3,285,628
TUBE JOINT

Filed June 16, 1964   2 Sheets-Sheet 2

GERRIT DE VRIES
*INVENTOR.*

BY V. C. MULLER
ATTORNEY.

3,285,628
TUBE JOINT
Gerrit De Vries, 2902 N. Stonehill Drive, Altadena, Calif.
Filed June 16, 1964, Ser. No. 375,677
6 Claims. (Cl. 285—27)

The invention described herein may be manufactured and used by or for the Government of the United States of America for governmental purposes without the payment of any royalties thereon or therefor.

This invention relates to joint devices for removably securing together the adjacent ends of axially aligned cylindrical tubular members, such as torpedo hull sections, rocket motor casings, pipes and the like.

Some of the general requirements of a joint device of the type referred to, and particularly for use in ordnance, are that the tubular members have a smooth exterior surface, occupy a minimum amount of interior space, be readily assembled and disassembled, and provide a joint strength approaching that of the tubular members. Other desirable features would be to have no loose parts or require special tools for securing the joint together or taking it apart.

Various joint devices have been proposed which meet certain of these requirements including longitudinal bolts, radial bolts, clamp rings and lockwires. The patent to Hillmer 3,100,121, is exemplary of the general class of lockwire devices, and the patent to Eaton, referred to in the Hillmer patent, is exemplary of the clamp ring type. All of the types referred to are, in general, quite complicated and costly of manufacture. Depending upon the intended use of a joint device, the foregoing may or may not be important criteria and probably no joint has been devised which is the most desirable for all intended uses. As will subsequently appear, however, the present invention provides a joint device which satisfies all of the requirements referred to along with the further desirable features.

One of the objects of the invention is to provide a joint device having a minimum number of parts.

Another object is to provide a joint device which secures a pair of tubular members together in precise abutting relationship and axial alignment without requirement of close machining tolerances in the joint parts.

A further object is to provide a simplified joint device which is as strong as or stronger than the tubular members which it secures together.

A still further object is to provide a joint device which may be assembled or disassembled with conventional tools which are readily available.

Still further objects, advantages and salient features will become more apparent from the description to follow, the appended claims, and the accompanying drawing, in which:

Figure 1:
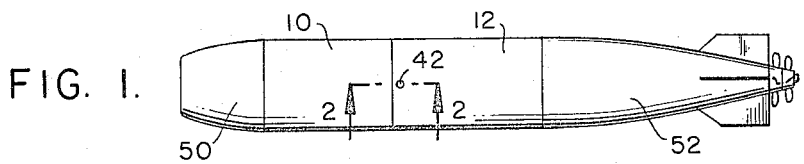
FIG. 1 is a side elevation of a plurality of axially aligned tubular members, exemplified as a torpedo, embodying the subject of the invention.

Referring now to the drawing, and first to FIGS. 2, 2A, 2B and 3, which illustrate the subject of the invention in its most simplified form, the basic requirement is that axially aligned tubes 10, 12 be secured together in abutting relation so that their outer surfaces are smooth and continuous and without any projections or depressions, thus presenting an outer surface identical to a single integral tube without a joint. Tubes 10, 12 are of uniform wall thickness except at their ends where they are provided with annular integral flanges 14, 16, respectively. If the tubes are of castable material the flanges may be formed as an integral part of the castings. If the tubes are forgeable material, such as steel, the ends may be upset or thickened to provide sufficient material for the integral flanges. As will also be apparent any other well known fabrication techniques may be employed to form the flanges. Flanges 14, 16 are provided with internal threads 18, 20, respectively, which, when the ends of the tubes are in abutting relation form a continuous internal thread without any discontinuity in its lead. If the tubes are relatively short, such thread may be formed by securing the tubes together in abutting relation with any suitable type of exterior fixture and forming the threads with a boring tool or with a tap. The tubes must also be secured together against relative rotation, such as with a plurality of dowel pins 21, so that they may be assembled in only one relative position, whereby when assembled in abutting relation the thread will always be continuous as bored or tapped.

Figure 2:
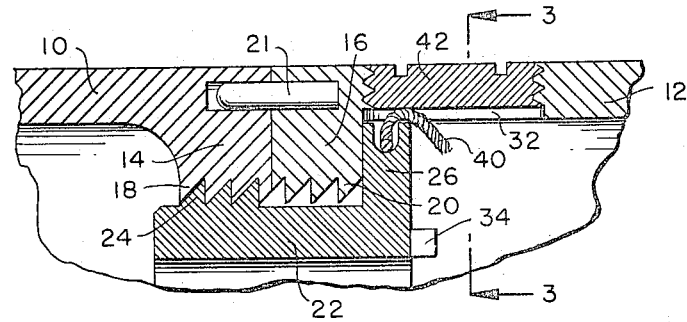
FIG. 2 is an enlarged section taken on line 2—2, FIG. 1.
Figure 2A:
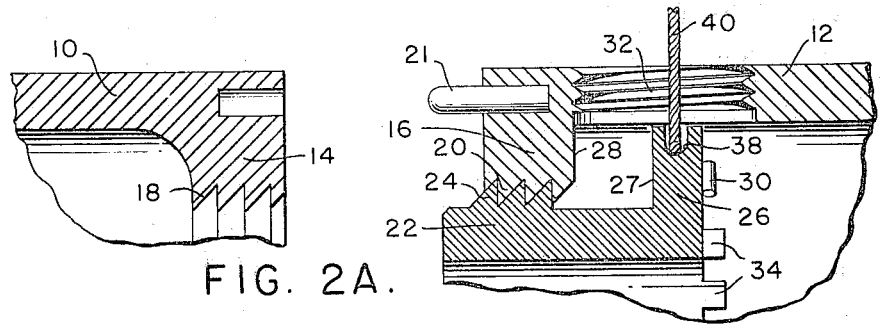
FIG. 2A is a section, like FIG. 2, illustrating parts in disassembled relationship.
Figure 2B:
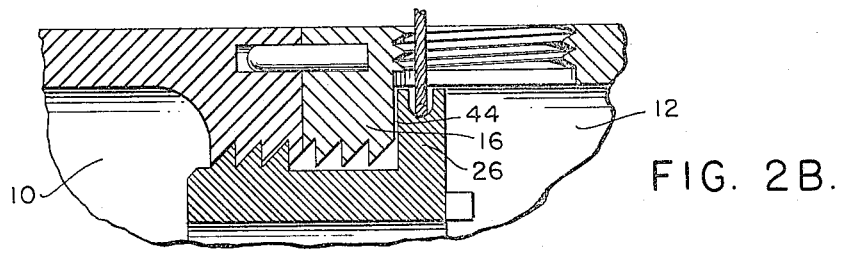
FIG. 2B is a like section illustrating the parts in partial state of assembly.

The single member for securing tubes 10, 12 together is a ring 22 having an external thread 24 and an outwardly projecting flange 26, face 27 of which abuts face 28 of flange 16. As shown in FIG. 2A the ring is inserted through the remote (right) end of tube 12 and rotated to the position shown. Any suitable stop, such as a stop pin 30, may then be applied to tube 12 to prevent inadvertent removal of the ring.

Figure 3:
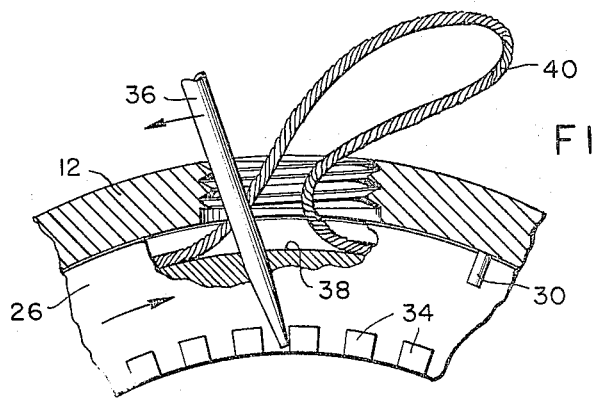
FIG. 3 is a section taken on line 3—3, FIG. 2.

It will now be assumed that the ring is no longer accessible from the remote end of tube 18, either by reason of filling the tube with various components (such as employed in a torpedo) or by joining the remote end to another member which precludes accessibility. The means for rotating the ring comprises an access aperture 32 extending through the wall of tube 12 and any suitable angularly spaced projections 34 on the ring which may be engaged by a tool 36, such as a screw driver or the like, which may be inserted through the aperture. As will be apparent, with a sequential prying action against the projections the ring may be rotated. If it is desired to rotate the ring more rapidly a groove 38 may be provided in the ring which receives an endless cable 40 which serves as a belt to rotate the ring. Its peripheral length is sufficiently in excess of the peripheral length of the groove to permit a portion to extend outside of tube 12 as shown in FIG. 3. After rapidly rotating the ring to its near final position the prying tool is employed only to effect final tightening of the ring. The cable is then tucked into aperture 32 and the latter closed by a plug 42.

In the assembly of the tubes ring 22 will first be in the position shown in FIG. 2A, thread 24 being entirely within tube 12. The tubes are next abutted together, in angular registry and the ring is rotated. Since the two internal threads now form a continuous thread and since thread 20 provides restraint of the ring to rotate precisely in a plane transverse to the axis of the tubes, thread 24 will engage thread 18 in flange 14. As will be apparent, however, this action does not draw the tubes together. When the ring has moved to the position shown in FIG. 2B, thread 24 disengages from thread 20. There is now a small clearance space 44 between flange 26 and flange 16. Continued rotation will now cause flange 26 to engage flange 16. The rotation so far described may be quickly performed with cable 40. The tool is then inserted through aperture 32 and the ring pried to final position in which the ends of the tubes are in tight axial abutment. Plug 42 is then applied to aperture 32. As will be apparent, the tubes may be disassembled by reversing the assembly steps.

As will now be apparent, thread 20 serves no purpose after the tubes are assembled. Its sole purpose is to provide a guide during assembly and disassembly which restrains the ring to rotate in a plane perpendicular to the tube axis and thereby cause thread 24 to smoothly move into thread 18 during assembly and to move into thread 20 during disassembly. If thread 20 were not provided it is apparent that it would be exceedingly difficult to engage thread 24 with thread 18 with the highly limited access through aperture 32.

Figure 4:
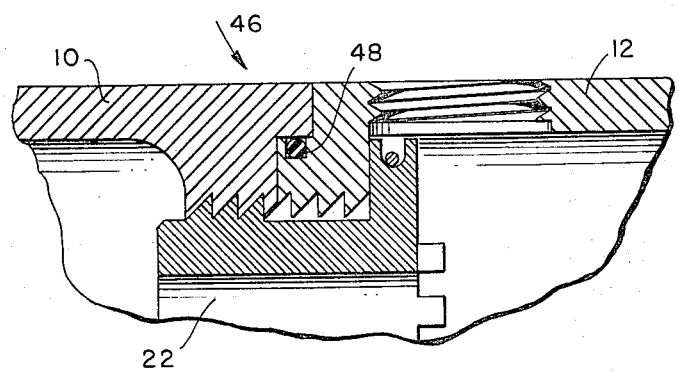
FIG. 4 is a section like FIG. 2, illustrating one form of joint seal.

When the joint device is employed with tubes under internal or external pressure some sort of seal will normally be required. FIG. 4 is exemplary of such construction. All structure previously described is identical except that the ends of the tubes are provided with a stepped joint 46 which forms confronting circular telescopic surfaces which may be sealed with an O-ring 48.

Figure 5:
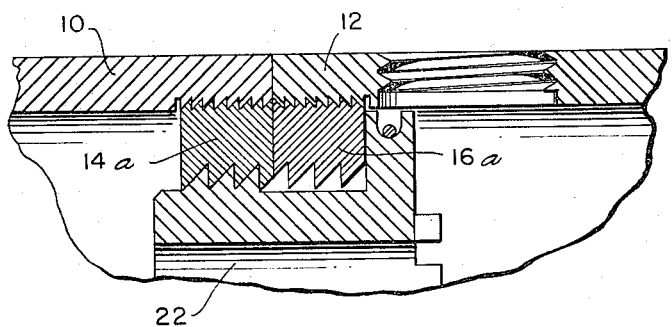
FIG. 5 is a section like FIG. 2 illustrating a modified form of the invention.

In some uses of the invention tit may be desired to join tubes wtihout employing integral annular flanges 14, 16. FIG. 5 illustrates a modification in which flanges 14A, 16A are screw threaded into the ends of the tubes after which they may be pinned or otherwise secured in proper relation. Ring 22 engages threads on these insert rings in the same manner as the integral flange construction previously described. This construction may be desirable when the tubes are constructed of soft material such as aluminum. The inserts would be of steel or other strong material as well as the ring. Another advantage of the threaded insert construction is that it permits the ring to be inserted through the end of a tube adjacent a joint, rather than through the remote end of the tube. Thus ring 22 may first be inserted into tube 12 and insert 16A thereafter be applied to tube 12. This construction therefore permits joining one tube with another tube, the remote end of one being closed and thus precluding insertion of the ring. FIG. 1 illustrates an application of this modification in which an end tubular member, such as the nose section 50 or a tail cone section 52 of a torpedo has no remote end opening through which the ring may be inserted. As will be apparent, however, by employing the insert construction of FIG. 5 the ring may be disposed in its operative position through the only open end. It becomes apparent, therefore, that by employing the construction of FIG. 5, or in combination with the construction of the other figures, it is possible to employ the subject of the invention for all joints of a torpedo or all joints of other tubular members even though a terminal member has no access for applying the ring except through the opening adjacent the joint.

While a buttress type of thread has been illustrated it will be apparent that any other conventional type of thread may be employed.

Obviously many modifications and variations of the present invention are possible in the light of the above teachings. It is therefore to be understood that within the scope of the appended claims the invention may be practiced otherwise than as specifically described.

What is claimed is:
1. A tube joint comprising:
  (a) a first cylindrical tube having a first internal thread adjacent one end thereof,
  (b) a second cylindrical tube having a second internal thread adjacent one end thereof,
  (c) said tubes being disposed in axial alignment with an end of one tube admitting an end of the other tube and in a plane transverse to the axis of the tubes, the tubes being the same external diameter at their junction, whereby the outer surface of one tube forms a smooth continuation of the outer surface of the other tube,
  (d) said second tube having an annular radially extending abutment surface spaced from its end and extending from said second internal thread to the inside surface of said second tube,
  (e) a ring for securing said tubes together,
  (f) said ring having a radially outwardly extending annular flange adjacent one end thereof with a surface thereon for engaging said annular abutment surface,
  (g) said ring having external threads extending from its other end to a transverse plane spaced from said surface on the flange and so proportion that its threads engage only said second threads when the tubes are disassembled, engages both said first and second threads when said ring is rotated during assembly, and engages only said first threads during final assembly, and when said surface on the flange engages said annular abutment surface,
  (h) an aperture extending through said second tube at a position spaced from its end to provide access to said ring, whereby it may be rotated from a position adjacent the outside of said second tube,
  (i) means for indexing the tubes together and against relative rotation in a position such that when the ends of the tubes are in abutting relation said first and second internal threads form a continuous thread to thereby permit said external threads to move into engagement with one or the other of the internal threads when it is rotated during assembly or disassembly, and
  (j) means for closing said aperture.
2. A device in accordance with claim 1 including means on said ring engageable with a tool extending through said aperture for rotating said ring.
3. A device in accordance with claim 1 including an endless belt extending around said ring and of a length such that a portion thereof may be engaged from outside said second tube for rapidly rotating said ring.
4. A device in accordance with claim 1 including means for sealing said tube joint against fluid leakage thereacross.
5. A device in accordance with claim 1 wherein said second internal thread is formed as an integral portion of said second tube.
6. A device in accordance with claim 1 wherein said second internal thread is formed as an insert adapted to be secured to said second tube, whereby said ring may be inserted into said second tube from the joint end thereof and the insert thereafter inserted in the tube.

References Cited by the Examiner

UNITED STATES PATENTS

| | | | |
|---|---|---|---|
| 658,692 | 9/1900 | Williams | 285—386 X |
| 1,348,277 | 8/1920 | Gerrish | 285—354 X |
| 2,877,732 | 3/1959 | Eaton | 285—121 X |
| 3,089,654 | 5/1963 | Vowdy | 285—39 X |
| 3,195,928 | 7/1965 | Pasternalk | 285—18 |

THOMAS F. CALLAGHAN, *Primary Examiner.*

DAVE W. AROLA, *Assistant Examiner.*